United States Patent [19]
Carrouge

[11] 3,984,638
[45] Oct. 5, 1976

[54] PROCESSOR FOR USE BETWEEN KEYBOARD TELEPHONE SET AND TELEVISION SET

[76] Inventor: Christian P. Carrouge, 17, Le Parc de Diane, 78350 Jouy en Josas, France

[22] Filed: Jan. 21, 1975

[21] Appl. No.: 542,801

[52] U.S. Cl. .......................... 179/2 DP; 179/2 TV; 340/324 AD
[51] Int. Cl.² ........................................ H04M 11/06
[58] Field of Search ................. 179/2 R, 2 A, 2 DP, 179/2 TV; 340/324 A, 324 AD; 178/6.8

[56] References Cited
UNITED STATES PATENTS

| | | | |
|---|---|---|---|
| 3,345,458 | 10/1967 | Cole | 340/324 A |
| 3,641,555 | 2/1972 | Griffin | 340/324 AD |
| 3,647,973 | 3/1972 | James | 179/2 DP |
| 3,675,513 | 7/1972 | Flanagan | 179/2 DP |
| 3,685,039 | 8/1972 | Flanagan | 340/324 AD |
| 3,746,793 | 7/1973 | Sachs | 179/2 TV |
| 3,822,363 | 7/1974 | Moyer | 179/2 TV |

Primary Examiner—Kathleen H. Claffy
Assistant Examiner—Joseph A. Popek
Attorney, Agent, or Firm—Abraham A. Saffitz

[57] ABSTRACT

Processor for use between an earpiece of a keyboard telephone set serving to interrogate a computer by means of multi-frequency code interrogation signals and to receive from said computer digital serial answer words beginning with a start signal and frequency modulating an answer carrier, and a television set for displaying alpha-numeric characters corresponding to these digital answer words. The conventional telephone sets include means for inhibiting the answer signals from being applied to the earpiece when a key of the keyboard is depressed. Also when a key of the telephone set is depressed on overvoltage is produced across the earpiece terminals which would give rise to false start signals if no precaution was taken. Accordingly, the processor comprises a frequency demodulator for receiving the frequency modulated signals corresponding to values zero and one of the bits of the answer words, a receive register controlled by the start signals and means for allowing the frequency demodulator to generate a zero output signal when the frequency of the frequency modulated carrier has the value corresponding to a selected binary value, one or zero, of the bits of the answer words so that, when a key of the keyboard of the telephone set is depressed and the answer frequency modulated carrier is then inhibited, the output signal from the demodulator is the same as when a modulation frequency corresponding to said selected value is received.

3 Claims, 5 Drawing Figures

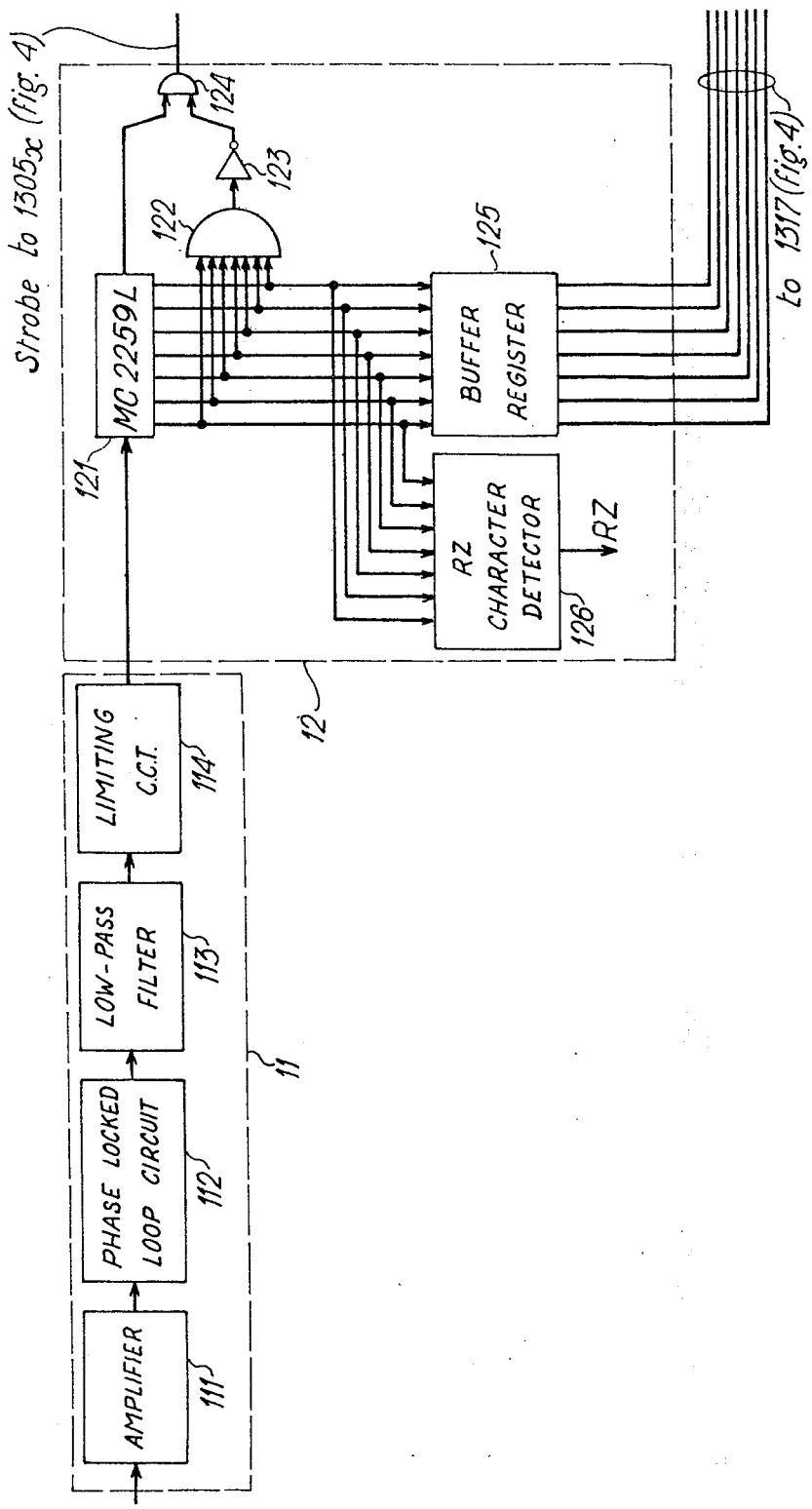

PROCESSOR FOR USE BETWEEN KEYBOARD TELEPHONE SET AND TELEVISION SET

BACKGROUND OF THE INVENTION

1. Field Of The Invention

The present invention relates to processors permitting a telephone subscriber having a television set to communicate with a computer, the keyboard telephone set of the subscriber serving as a terminal for transmitting and receiving digital signals and the television set serving as a display console.

No modification is required either in the telephone set or in the television set and the processor is connected between terminals for an additional earpiece on the telephone set and the aerial socket of the television set. It is also possible to connect the processor to an acoustic coupler to which the user applies the telephone set. The transition from the reception of a television channel to the displaying of computer answers takes place through a channel switch in the television set.

2. Description of the Prior Art

The conventional multi-frequency call keyboard telephone sets emit two audio frequencies when a call key is depressed. The two emitted frequencies are a lower frequency selected from the group comprising the frequencies 697, 770, 852, and 941 Hz, and a high frequency selected from the group comprising the frequencies 1209, 1336, and 1477 Hz. The computer is interrogated through keys of the keyboard which have two meanings, i.e. a digital meaning and a functional meaning as will be explained below.

The computer reply is returned as a frequency modulation, the frequency of 1650 Hz representing logic level one and the frequency of 1850 Hz representing logic level zero. Words representing the characters comprise seven code bits, a parity bit, a start bit and two stop bits. In the case of a transmission speed of 200 bits per second, the modulation spectrum ranges between 1500 and 2000 Hz. The seven-bit code words representing the characters are translated by the processor into alpha-numeric characters of a matrix having 35 points stored in a read-only memory.

OBJECT OF THE INVENTION

An object of the present invention is to provide a processor associated with a telephone keyboard set and with a television set which is simple and inexpensive to allow anybody possessing two such sets to be in a position of communicating with a computer.

The processor is required to perform three main functions:

1. It demodulates the digital response signals from the computer.
2. It decouples the television set from interrogation signals sent by the telephone set, because the interrogation signals are not of the same structure as the response signals and cannot be displayed on the television set.
3. It arranges in lines and columns the displayed alpha-numeric response characters on the screen of the television set.

When a key of a keyboard telephone set is depressed, an overvoltage occurs, as will be better explained below, across the terminals of the earpieces which could result in false starts at the unit receiving and controlling the digital signals from the demodulator. Means are provided for eliminating the strobe signal generated by the receiving and controlling unit upon such false starts occurring.

SUMMARY OF THE INVENTION

The present invention consists in a processor for use between an earpiece of a keyboard telephone set serving to interrogate a computer by means of multi-frequency code interrogation signals and to receive from said computer digital series answer words beginning with a start signal and frequency modulating an answer carrier, and a television set for displaying alpha-numeric characters corresponding to the digital answer words, the processor comprising a frequency demodulator for receiving the signals corresponding to values 0 and 1 of the bits of the answer words, a register for storing the digital words omitting the start signal, a memory of alpha-numeric characters addressed by the digital words, and a spatial addressing device by lines and columns of the alpha-numeric characters on the screen of the television set, the frequency demodulator being arranged to generate a zero output signal when the modulation frequency has a value corresponding to one of the binary values of the bits of the answer words so that, when a key of the keyboard of the telephone set is depressed and an answer frequency is then attenuated, the output signal from the demodulator is the same as when a modulation frequency having the said value is received.

BRIEF DESCRIPTION OF THE DRAWING

A preferred embodiment according to the invention will be described with reference to the accompanying drawings, in which:

FIG. 3 shows the demodulator and the receiving and controlling unit; and

DESCRIPTION OF THE PREFERRED EMBODIMENT

In the embodiment described below, the characters or words of data are assumed to have a seven-bit code and the television images are assumed to be images of a single frame of 312 lines.

Figure 1:
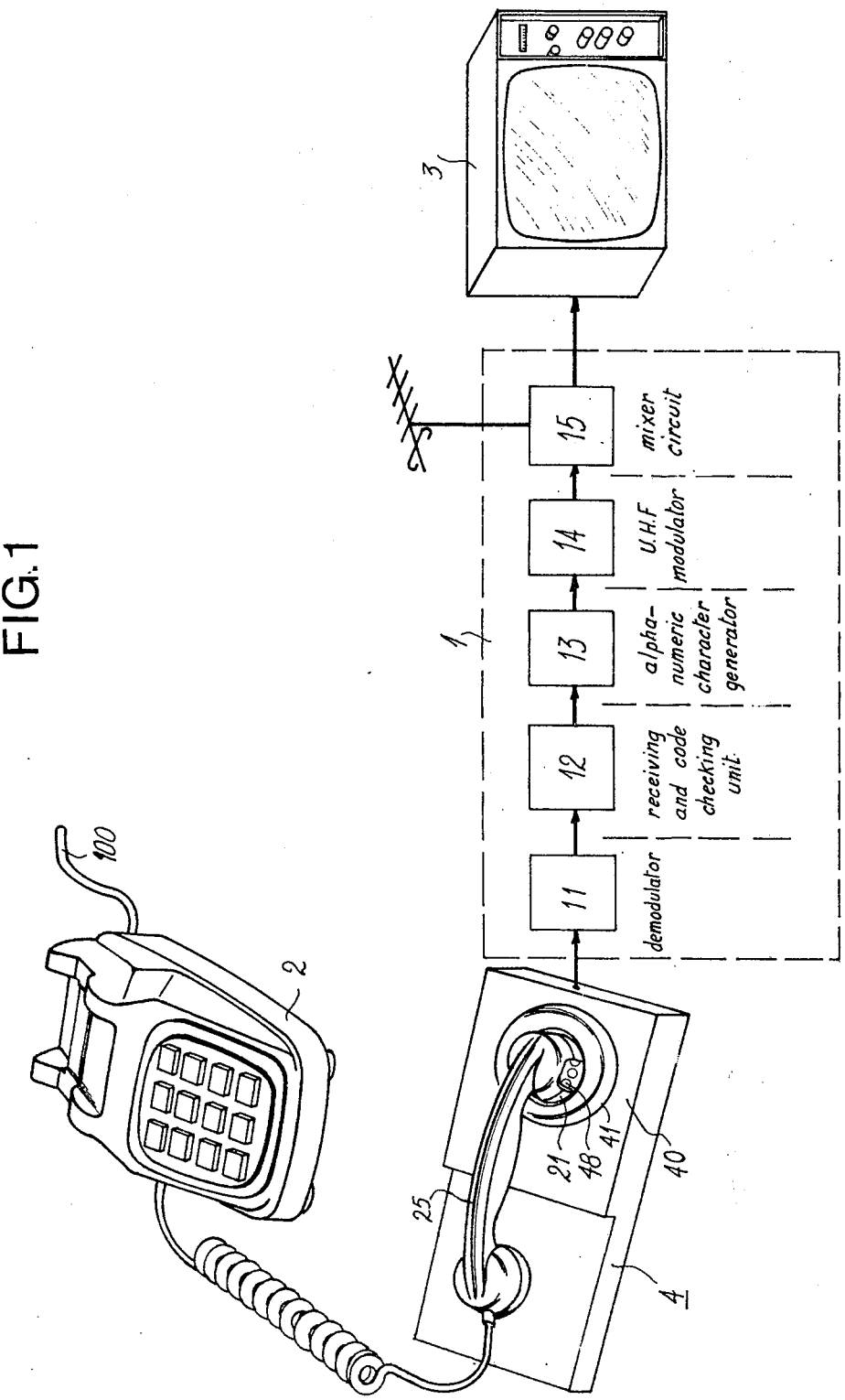
FIG. 1 is a block diagram of a device according to the invention and shows in more detail the connection system to the telephone line through an acoustic coupler.

With reference to FIG. 1, the subscriber's installation comprises a keyboard telephone set 2, a television set 3, and a processor 1 connected between the telephone set and the television set. The keyboard telephone set is connected through a telephone line 100 to an exchange through which it can be connected to a computer.

The input of the processor 1 is connected to the telephone set 2 either through an acoustic coupler 4 as shown or directly to terminals for an additional earpiece of the telephone set. The output of the processor 1 is connected to the aerial terminal of the television set 3.

The processor 1 comprises a demodulator 11, a receiving and controlling unit 12, an alpha-numeric character generator 13, an ultra-high frequency modulator 14 and a mixer 15.

The telephone set 2 is a conventional set having 12 keys of which 10 are numeric keys and 2 are functional keys which will be indicated here by the name of function-switching keys. Each numeric key has two meanings, i.e. its conventional decimal meaning and an interrogation meaning with respect to the computer such as a mathematic function meaning. It is possible to pass from one meaning to the other by depressing one of the function-switching keys which are like the "letter" and "digit" keys of a teleprinter. For example, if the keyboard telephone set is designed to ask the computer the values of mathematical functions, the two function-switching keys will be indicated as digits and "functions". If one would like to know "Arc tg. .577", the functions key will be depressed and then the numeric key marked Arc tg., after which the digits key and finally the numeric keys 0.577 will be dialled.

Figure 2A:
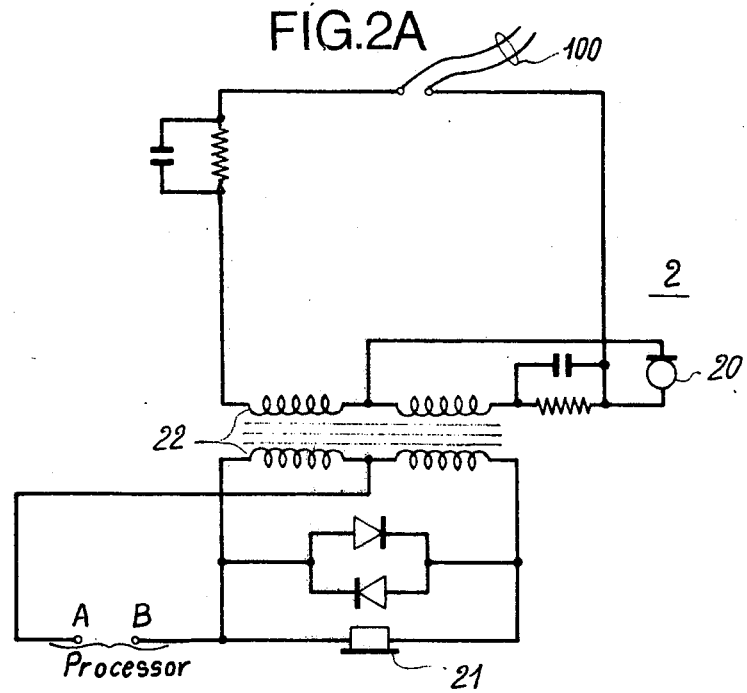
FIGS. 2a and 2b illustrate the circuit diagram of a keyboard telephone set in a speech condition and in a calling condition, respectively.
Figure 2B:
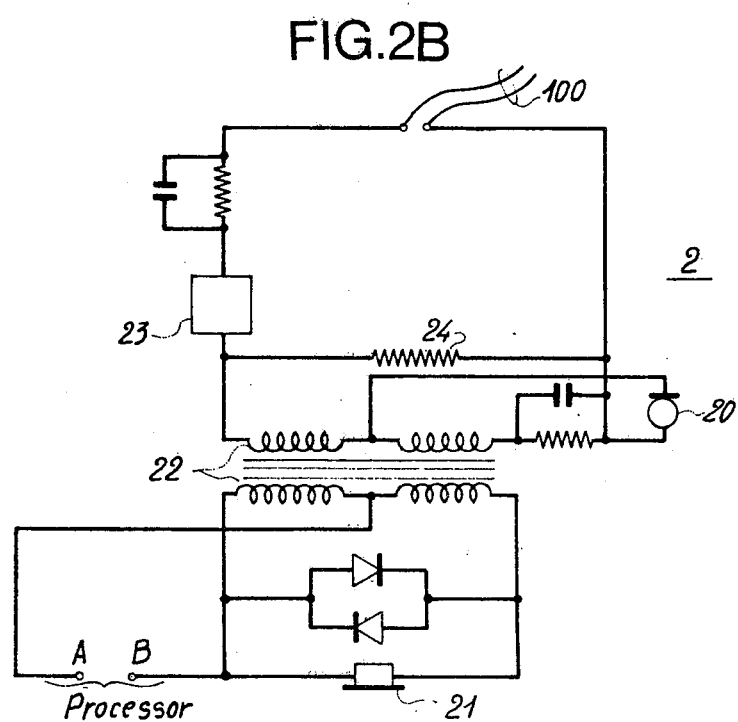

FIGS. 2a and 2b show the keyboard telephone set 2 in a speech condition and in a calling condition, respectively, i.e. with a depressed key. A microphone 20, an earpiece 21, a differential transformer 22, terminals A-B for an additional earpiece, to which the processor 1 can be connected, and the audio frequency call emitter 23 are shown. When a key is depressed, a resistor 24 of low value such as 10 ohms is connected across the terminals of the differential transformer 22. This resistor has the object of reducing the level of the audio frequency signal across the normal and additional earpieces. However, when a key is depressed or released, a transitional condition occurs owing to the connection and disconnection to the current supply. Despite the presence of the resistor 24, a signal occurs across the terminals of the earpieces and then across the terminals of the processor owing to the effect of the inductance of the winding of the transformer.

It is necessary to prevent the words corresponding to these false starts from reaching the alpha-numeric character generator and the spatial addressing device.

The acoustic coupler 4 is an optional element. It comprises a base 40 and, a crown 41 of resilient material on the base. On this crown, the earpiece 21 of the handset 25 of the telephone set 2 is located. The upper part of the base is perforated in the form of a grid in the middle of the crown and a microphone 48 acoustically connected to the earpiece 21 is arranged beneath this grid. The output of the microphone 48 forms the input of the processor.

With reference now to FIG. 3, The demodulator 11 comprises an amplifier 111, a phase locked loop circuit 112, a low-pass filter 113 and a limiting circuit 114. The phase locked loop circuit is, for example, of the type NE 560 B manufactured by Signetics Corporation. It comprises an oscillator tuned to a frequency $f_i$ and when it receives an input signal at a frequency $f_p$, it generates an output signal the amplitude of which is proportional to $(f_p-f_i)$. The oscillation frequency $f_i$ of the phase locked loop circuit is arranged to be one of the carriers 1650 or 1850 Hz, for instance 1650 Hz which corresponds to the logic bit 1. As a consequence, the output signal from the demodulator has a zero amplitude which corresponds to the logic 1 when the carrier is 1650 Hz and an amplitude determined by the limiting circuit 114 when the carrier is 1850 Hz corresponding to a logic 0. When a key is depressed, the carrier is cut-off and no frequency-modulated signal is applied to the input of the demodulator The output signal is a signal of a frequency of 1650 Hz which is blocked by the filter 113. Accordingly, when the keys of the keyboard of the telephone set are actuated, the demodulator supplies signals of zero amplitude corresponding to logic ones to the code receiving and controlling unit 12.

The code receiving and controlling unit 12 is, for example, a receptional terminal circuit 121 of the type "MC 2259 L" manufactured by MOTOROLA Semiconductor Products Inc. As was explained with reference to FIGS. 2a and 2b, the actuation of one key results in an overvoltage at the input of the demodulator which can cause false starts in the circuit MC 2259 L. Such a false start is not followed by the reception of a signal and, as indicated below, this corresponds to the reception of a signal consisting of logic ones. Thus, the unit 121 generates words formed of ones only each time a key of the telephone set is depressed. These words are detected by the AND-gate 122 and the output signal from this gate is inverted by the inverter 123 and is applied as an inhibition signal to the AND-gate 124 provided at the output of the circuit MC 2259 L producing the strobe signal. Thus, operation of the keys of the telephone set does not generate any signal at the output of the code receiving and controlling unit 12.

It is assumed that the useful part of the screen of the television set 3 can display 22 rows of 40 characters, i.e. 880 characters. A row comprises 12 television lines, seven of which correspond to the characters and five to the interval between the top and the bottom of two successive rows of characters.

Figure 4:
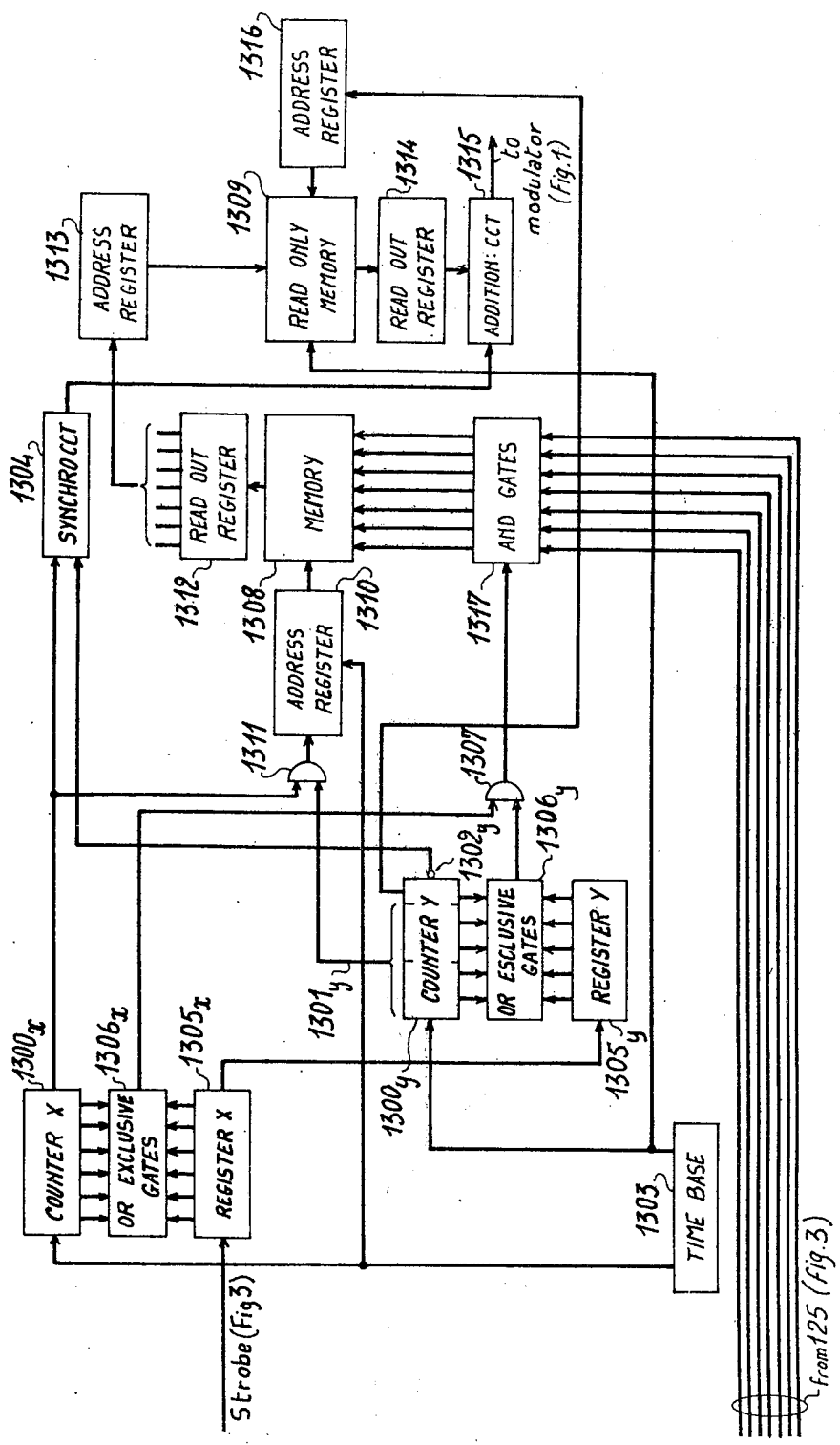
FIG. 4 shows the generator of alpha-numeric characters and the spatial addressing system of displaying by lines and columns.

With reference to FIG. 4, $1300_x$ and $1300_y$ indicate two counters the first of which, $1300_x$, has six bits and counts from 0 to 39, and the second, $1300_y$, comprises three parts, the first of which has four bits and counts from 0 to 11, the second of which has five bits and counts from 0 to 21 and the third has 1 bit and counts from 0 to 1. The counter $1300_y$ is designed to count up to 312 and to generate a signal on its output $1301_y$, when the numbers $(12k-1)$ are attained, where $k$ is an integer, and a signal on its output $1302_y$ when 312 is attained. The manner of connecting the parts of the counter to each other and of resetting each of said parts is well known in the art.

The counters $1300_x$ and $1300_y$ are controlled by impulses supplied by a time base 1303 which differs from the time base contained in the circuit MC 2259 L and operates continuously as soon as the device according to the invention is put into operation.

Each time the counter $1300_x$ attains 40, i.e. when it overflows, it operates a synchronization circuit 1304 which then emits a line flyback pulse. Each time the counter $1300_y$ 312, it operates the synchronization circuit 1304 which then emits an image flyback pulse.

The reference number $1305_x$ indicates a six-bit register which is stepped forward by one unit for each output impulse from the gate 124 (end-character impulses) and counts up to 40. The reference number $1305_y$ indicates a five-bit register which is stepped forward by one unit for each output impulse from the register $1305_x$ and counts up to 22.

The counters $1300_x$ and $1300_y$ define the addresses x and y of 880 rectangles of the screen and synchronously scan these addresses by successive horizontal rows. The registers $1305_x$ and $1305_y$ define the address of a particular rectangle corresponding to the location of the next character to be received. They then scan the addresses of the rectangles in an asynchronous manner.

The simultaneous equality of the contents of the counter 1300 and of the register $1305_x$ on the one hand, and of the counter $1300_y$ and of the register $1305_y$ on the other, is detected by EXCLUSIVE-OR-gates $1306_x$ and $1306_y$ and by an AND-gate 1307 and, when this equality occurs, a transfer signal is generated which causes the character of the buffer register 125 to be transferred into the memory 1308 through the AND-gates 1317. The memory 1308 is the addressing memory of the read-only memory 1309.

The memory 1308 is scanned in synchronism with the counters $1300_x$ and $1300_y$. To this end, the address counter 1310 of the memory 1308 receives the counting pulses from the time base 1303. On the other hand, the overflow output of the counter $1300_x$ (the counter has counted forty characters) and the output $1301_y$ of the counter $1300_y$ (the counter has counted twelve lines) are connected through the AND-gate 1311 to an additional input of the counter 1310 to increase its contents by 40. The address counter 1310 then counts from 0 to 39 for the duration of 12 lines, then from 40 to 79 for the duration of 12 lines, . . . finally from 840 to 879 for the duration of 12 lines.

Since the counters $1300_x$ and $1300_y$ and the counter 1310 are synchronous, the transfer of the $N^{th}$ character received $$N = 40y + x \qquad 0 \leq N \leq 879$$

takes place in the address word $40y + x$ of the memory 1308.

The memory 1308 has a reading register 1312 the contents of which can be transferred upon control from the time base 1303 into the address register 1313 of the read-only memory 1309. The memory 1309 has a five-bit reading register 1314 the contents of which can be series extracted and sent to the addition circuit 1315 in which it is added to the synchronization signals from the synchronization circuit 1304. The output signal from the addition circuit 1315 is applied to the input of the UHF modulator 14.

As each address is transferred into the address register 1313, the selection of the television line to be displayed takes place by entering into the address register 1316 the four binary digits of lowest weight from the counter $1300_y$. The memory 1309 then sends a five-bit word, each bit determining whether a corresponding point on the selected line of the 7 lines of the character is to be displayed.

The signal RZ from the character detector 125 serves to reset the counters and registers $1300_x$, $1305_x$, $1300_y$, $1305_y$, 1308, 1310, 1312, 1313, 1314, to zero and to fully load the memory 1308 through a non-displayed character (space character).

Although the invention has been described with reference to a particular embodiment thereof, it should be understood that modifications easily conceivable by a person skilled in the art are possible, particularly as far as the number of the code elements per character, the number of lines per image, the choice of the frequency of the modulator 14 (which could operate at a VHF frequency) and the number of operational keys are concerned. Similarly, the mixer 15 which mixes the signals of the device according to the invention with the aerial signals is not indispensable; it has the object of allowing the aerial to remain connected when on wishes to use the television set for displaying alpha-numeric characters.

What I claim is:

1. In a processor for use between an earpiece of a keyboard telephone set serving to interrogate a computer by means of multifrequency code interrogation signals and to receive from said computer digital serial answer words beginning with a start signal and frequency modulating an answer word carrier, and a television set for displaying alpha-numeric characters corresponding to the digital answer words, said telephone set including means for inhibiting the answer frequency modulated carrier from being applied to said earpiece when a key of said keyboard is depressed for multifrequency code interrogation signal transmission, the improvement consisting of:

a frequency demodulator for receiving the frequency modulated signals corresponding to values zero and one of the bits of the answer words;

a receive register controlled by said start signals for storing the digital answer words;

a read only memory of alpha-numeric characters addressed by said digital words;

a spatial addressing device addressing by lines and columns the alpha-numeric characters on the screen of the television set; and adjustment means controlled by said frequency demodulator to generate a zero output signal when the input frequency of the frequency modulated carrier has a value corresponding to one of the binary values of the bits of the answer words, so that, when a key of the keyboard of the telephone set is depressed and the answer frequency modulated carrier is then inhibited, the output signal from the demodulator is the same as when a modulation frequency corresponding to said one of the binary values is received;

said adjustment means including frequency control means to limit the frequencies of the multi-frequency code range between approximately 697 and 1477Hz and the carriers corresponding to the values 0 and 1 of the bits of the answer words ranging approximately between 1650 and 1850 Hz, said frequency modulator being thereby adjusted at 1650 Hz by said adjustment means, so that, when the demodulator receives a signal at 1650 Hz and when it does not receive any such signal, it produces in both cases a zero output signal.

2. A processor as claimed in claim 1, in which, in order to take into account false starts due to the overvoltage across the terminals of the earpiece of the telephone set when a key of the keyboard is depressed, the receive register which stores the digital answer words controlled by the start signals comprises gating means for inhibiting the received words formed by bits which all have the binary value corresponding to the frequency of the frequency modulated carrier at which the frequency demodulator is allowed to generate a zero output signal.

3. A processor as claimed in claim 1, in which the alpha-numeric characters in the read only memory are characters in the form of matrices of points arranged in 7 lines and 5 columns.

* * * * *